United States Patent [19]

Holland

[11] Patent Number: 5,313,877

[45] Date of Patent: May 24, 1994

[54] BARBECUE GRILL WITH CONTROLLED HEAT DISTRIBUTION

[76] Inventor: Robert B. Holland, 247 Summerwinds Dr., Cary, N.C. 27511

[21] Appl. No.: 125,023

[22] Filed: Sep. 21, 1993

[51] Int. Cl.$^5$ .......................... A47J 27/00; A47J 37/00
[52] U.S. Cl. .......................................... 99/446; 99/400; 99/447; 99/450; 99/482; 126/25 R; 126/41 R
[58] Field of Search ................ 99/340, 339, 375, 400, 99/401, 402, 408, 419, 421 H, 425, 444–446, 447, 450, 467; 126/25 R, 41 R; 431/328, 329

[56] References Cited

U.S. PATENT DOCUMENTS

| | | | |
|---|---|---|---|
| 3,455,233 | 7/1969 | Cable | 99/446 |
| 3,699,876 | 10/1972 | Ellis | 99/259 |
| 3,757,675 | 9/1973 | Wilbricht | 99/339 X |
| 3,882,767 | 5/1975 | Oyler | 99/339 |
| 3,982,476 | 9/1976 | McLane | 99/339 |
| 4,170,173 | 10/1979 | Bradford | 99/421 H |
| 4,362,093 | 12/1982 | Griscom | 99/401 X |
| 4,442,762 | 4/1984 | Beller | 99/450 X |
| 4,702,224 | 10/1987 | Griffith | 126/8 |
| 4,762,059 | 8/1988 | McLane, Sr. | 99/445 |
| 4,770,157 | 9/1988 | Shepherd et al. | 126/25 R |
| 4,773,319 | 9/1988 | Holland | 99/446 |
| 4,867,050 | 9/1989 | Patenaude et al. | 99/400 |
| 4,878,477 | 11/1989 | McLane | 126/41 R |
| 4,909,137 | 3/1990 | Brugnoli | 99/444 |
| 5,163,359 | 11/1992 | McLane, Sr. | 99/482 X |
| 5,195,423 | 3/1993 | Beller | 99/340 |

Primary Examiner—Timothy F. Simone
Attorney, Agent, or Firm—Richard E. Jenkins

[57] ABSTRACT

A barbecue grill including a lower housing, heating means and food support means positioned within the lower housing, an upper housing or hood adapted to enclose the lower housing, a grease collecting grease pan mounted within the top surface of the lower housing so as to prevent heat flow therearound into the upper housing, and a plurality of apertures provided adjacent at least a portion of the perimeter of the lower housing to provide heat flow from the lower housing into the upper housing.

14 Claims, 6 Drawing Sheets

BARBECUE GRILL WITH CONTROLLED HEAT DISTRIBUTION

TECHNICAL FIELD

The present invention relates generally to barbecue grills for cooking meats and other foods. More particularly, the present invention relates to an improved barbecue grill of novel construction which allows for control of the relative distribution of heat in the top and bottom of the grill so as to equalize cooking heat on certain selected foods (e.g., turkey, roast, and casseroles) or to heat certain selected foods primarily from below (e.g., hamburger, hot dogs and steak).

BACKGROUND ART

Outdoor barbecue grills have become very popular for outdoor cooking and are particularly enjoyed at both family cookouts as well as casual outdoor social occasions. As is well known to one skilled in the art, barbecue grills utilize different types of heating means for cooking meats and other foods. A conventional and well-known type of barbecue grill such as the WEBER ® brand kettle grill utilizes combustible charcoal briquettes (or wood chips and/or wood pellets) which must be replenished with each use of the grill for cooking. More recently barbecue grills have become popular which utilize propane (or natural gas) and electric heating elements, and these types of grills have displaced many conventional grills utilizing combustible charcoal briquettes due to their greater convenience to the user.

The propane (or natural gas) and electric barbecue grills act to heat permanent cement briquettes or lava rock so that greases from the food being cooked will fall thereon and be vaporized in order to create a smokey environment for the food being cooked and to impart additional smokey aroma and flavor thereto similar to the flavor imparted to food being cooked with conventional combustible briquettes on a barbecue grill. Thus, the propane (or natural gas) and electrically heated barbecue grills provide a measure of convenience which is not obtainable with conventional combustible briquette-heated barbecue grills. Yet, the more convenient and popular propane (or natural gas) and electrically heated barbecue grills provide substantially the same measure of tasty, smokey flavor which outdoor cooks obtain from old-fashioned, conventional barbecue grills.

Regardless of the type of barbecue grill utilized for outdoor cooking, it is well known that it is most difficult to obtain any measure of control over the heat in the bottom of the grill versus the heat in the top of the grill. The ability to control the heat in the bottom of the grill relative to the heat in the top of the barbecue grill would be a very desirable feature of a grill since foods being cooked segregate very distinctly into two classes: (1) foods such as steak, hamburger, hot dogs and other hot grill items which primarily are cooked with heat from below (or the lower portion of the grill); and (2) foods such as roast, turkey, prime rib, leg of lamb, pies, and casseroles which are most suitably cooked by uniform heat from both above and below (the lower and upper portions of the grill).

In the past, it has been very difficult to cook the latter types of foods on an outdoor grill, and thus these types of foods have more traditionally been cooked in conventional electric or gas indoor kitchen ovens. However, some success has been achieved to date in developing a barbecue-type outdoor grill which can cook both types of foods. A commercially successful example of such an outdoor grill is the HOLLAND ® brand grill manufactured by The Holland Company of the Carolinas located in Apex, N.C. This grill is the subject matter of applicant's own U.S. Pat. No. 4,773,319 which issued on Sep. 27, 1988. However, although capable of successfully cooking both types of foods, the HOLLAND ® brand grill does not provide a high degree of selective control of the relative heat in both the lower and upper portions of the grill, but rather provides a relatively uniform heat within the entire grill. The grill thus very effectively cooks foods requiring uniform heat distribution but less efficiently cooks foods primarily requiring heat from therebeneath in order to be most effectively cooked.

The quest therefore continues for the development of a barbecue grill which enables the user to control the relative heat distribution between the bottom and top of the enclosed grill so as to optimize the cooking of foods which require uniform heat distribution (e.g., roast and turkey) as well as foods requiring primarily heat from below (e.g., hamburgers, hot dogs and other hot grill items).

DISCLOSURE OF THE INVENTION

In accordance with the present invention, an improved barbecue grill is provided which solves the problems associated with prior art barbecue grill designs and provides a barbecue grill which provides the user with selective control of the relative heat in the lower and upper portions thereof to facilitate optimal efficiency in cooking such diverse foods as hamburgers, hot dogs and other hot grill items as well as roast, turkey, prime rib and casseroles.

The improved barbecue grill of the present invention comprises a lower housing having an upper and lower portion, heating means for providing cooking heat located within the lower housing, food supporting means supported by the lower housing and located within the upper portion thereof and above the heating means, and an upper housing or hood adapted to enclose the lower housing and having an upper and lower portion. A grease collecting drip pan is positioned beneath the food supporting means in the lower housing and adapted to be sealingly supported by the lower housing around the entire perimeter thereof so as to prevent heat flow therearound into the upper housing. A grease drainage system is positioned within the lower housing and fluidly communicates with the drip pan to effect disposal of cooking grease outside of the lower housing, and a plurality of apertures are provided adjacent at least a portion of the perimeter of the upper portion of the lower housing to selectively facilitate heat flow from the lower housing into the upper housing.

Accordingly, it is an object of the present invention to provide a barbecue grill, either stationary or portable, and utilizing any conventional type of heat means such as charcoal briquettes, gas or electricity, which is adapted to provide control of the heat in the bottom portion relative to the top portion of the grill.

Another object of the present invention is to provide a barbecue grill which provides selective control of the heat in the lower and upper portions thereof so as to enable the grill to be used as both a conventional barbecue grill and as a convection oven.

Another object of the present invention is to provide a barbecue grill which is adapted to provide selective heat flow between the lower and upper portions thereof so as to facilitate optimal cooking of such diverse cooking foods as hamburgers, hot dogs and other hot grill items as well as roast, turkey and casseroles.

Another object of the present invention is to provide a barbecue grill which will reduce flaming and the resultant fire hazard during the food grilling process.

Still another object of the present invention is to provide a barbecue grill which provides for increasing the effective cooking area relative to the size of the barbecue grill.

Some of the objects of the invention having been stated, other objects will become evident as the description proceeds, when taken in connection with the accompanying drawings described hereinbelow.

BEST MODE FOR CARRYING OUT THE INVENTION

Referring now more specifically to the drawings, a preferred embodiment of the invention is shown in FIGS. 1-6. More specifically, the barbecue grill with controlled heat distribution is designated generally by the numeral 10. Although a portable barbecue grill 10 is shown in the drawings, a stationary outdoor barbecue grill is contemplated as being within the scope of the present invention. Also, the barbecue grill may be of the type utilizing conventional charcoal briquettes as the heat source as well as a grill utilizing other heating means such as propane (or natural gas) and electricity and still be within the scope of the invention as presently contemplated by the applicant.

Barbecue grill 10 comprises a lower housing 12 and an upper housing or hood 14 most preferably constructed of aluminum and mounted On support leg 16 having a plurality of wheels (not shown) at the bottom thereof. Lower housing 12 includes a gas burner unit 18 which is most suitably connected to a propane gas tank (not shown) although other type of heat sources could be utilized with the present invention such as charcoal briquettes or an electric resistance heat source. Moreover, the present invention contemplates that support leg 16 of barbecue grill 10 could be secured in a stationary manner to an outdoor deck or to a cement footing adjacent a patio and gas burner unit 20 connected to a natural gas line.

Most suitably, a heat deflector plate 20 (see FIGS. 5 and 6) is positioned immediately over gas burner unit 18 and supported by legs 20A secured in a conventional fashion to the bottom of lower housing 12. Deflector plate 20 is preferably constructed of cast iron and acts to better distribute the heat from gas burner unit 18 in a manner well described in U.S. Pat. No. 4,773,319 issued to applicant on Sep. 27, 1988. Heat deflector plate 20 is a desirable feature of the instant novel barbecue grill 10 but the invention is not intended to be limited to incorporation thereof into the construction of novel grill 10.

A grease collector drip pan 22 (preferably constructed of stainless steel) is located above heat deflector plate 20 and comprises two downwardly sloping surfaces 22A, 22B and inclined channel 28C therebetween. Grease collector drip pan 22 defines a planar edge 22D around the entire perimeter thereof (see FIGS. 1-3) and is sized so as to be removable supported by a lip or ledge 12A extending inwardly from shoulder 12B extending around the entire perimeter of lower housing 12. Thus, grease collector drip pan 22 is removable supported on lip 12A around the entire perimeter of drip pan 22 so as to prevent any flow of heated air around the outer perimeter of drip pan 22 and into upper housing 14 of grill 10. In this manner, heat flow is prevented from leaving lower housing 12 and entering upper housing 14 of grill 10 except by means of apertures 12B' formed along at least one side or shoulder 12B and preferably all four sides of lower housing 12 (as shown in FIGS. 1-6). A portion of apertures 12B- may be selectively opened and closed by means of sliding damper mechanisms 30 (see FIGS. 3 and 4) which will be explained in more detail hereinbelow along with the significance of the function served by damper mechanisms 30 in providing the enhanced cooking efficiency possessed by novel barbecue grill 10.

Referring again to drip pan 22, it can be seen that the lower end of inclined channel 22C includes a grease drainage conduit 22C' connected thereto which extends downwardly through an opening 12C (see FIG. 1) in the bottom surface of lower housing 12 and is most suitably constructed of stainless steel.

Figure 3:
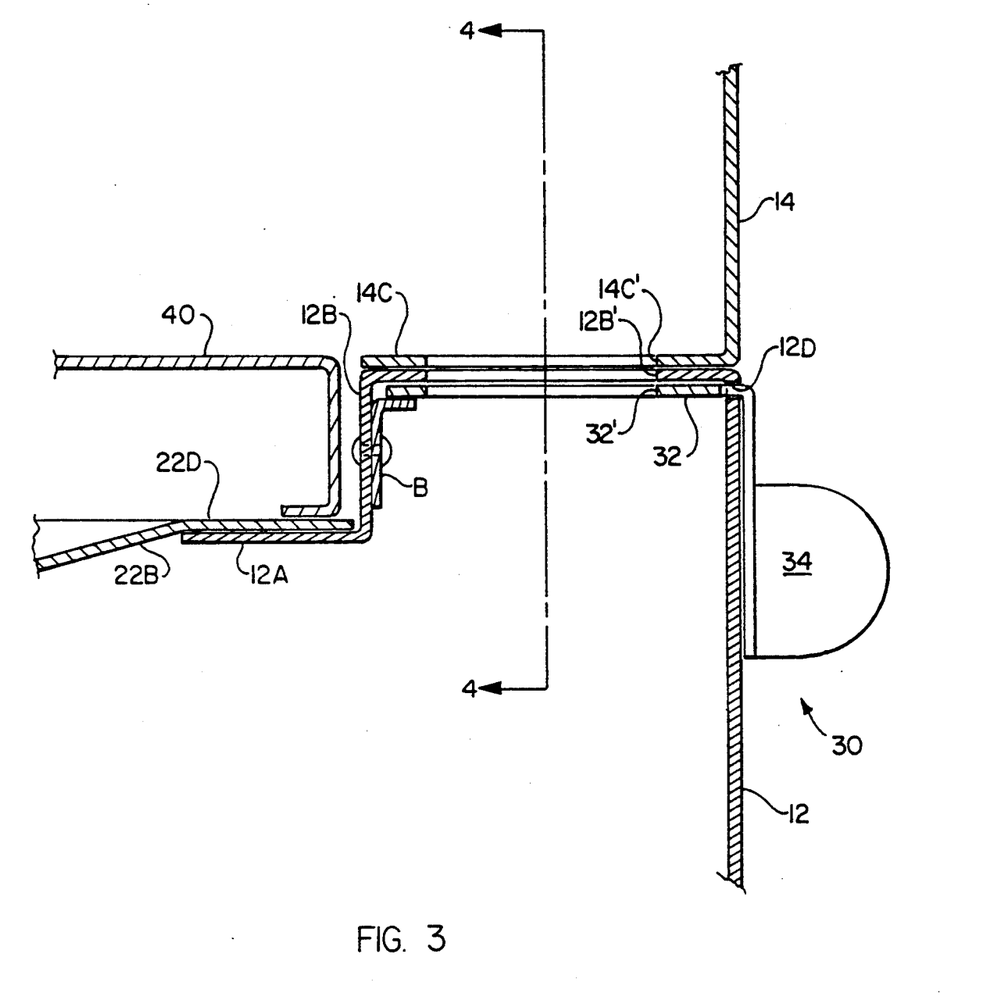
FIG. 3 is a vertical cross-sectional view taken along the line 3—3 of FIG. 1.

A food supporting grid 40 is positioned directly upon and removable supported by planar edge 22D of drip pan 22 (see FIG. 3). Food supporting grid 40 is most suitably constructed of stainless steel. Upper housing or hood 14 is pivotably attached to lower housing 12 by means of hinge H and further includes a handle HD and a chimney 14A for exhaustion of smoke from grill 10. Thus, upper housing 14 may be pivotally raised to an open position in order to place food onto food supporting grid 40 and then lowered in order to enclose grill 10 during the food cooking process. Although upper housing 14 is shown as pivotally mounted to lower housing 12 by hinge H in the preferred embodiment of the invention shown in FIGS. 1-6, applicant wishes to note that upper housing 14 can be of any suitable construction including being an entirely removable hood-type upper housing.

Finally, it should be appreciated that upper housing 14 includes a shoulder 14C around the entire perimeter thereof defining a plurality of apertures 14C' therein which are in vertical registration with apertures 12B' in lower housing 12 when upper housing 14 is closed. In this manner, heated air which flows through lower housing apertures 12B' will then flow through apertures 14C' of upper housing 14 and into upper housing 14 in a manner which will be described in more detail hereinafter. Baffles 14D are most suitably provided along the length of each side of upper housing 14 in order to prevent grease from dripping through apertures 14C' and 12B' and into lower housing 12 so as to pose a fire hazard when in proximity to gas burner unit 18.

Figure 4A:
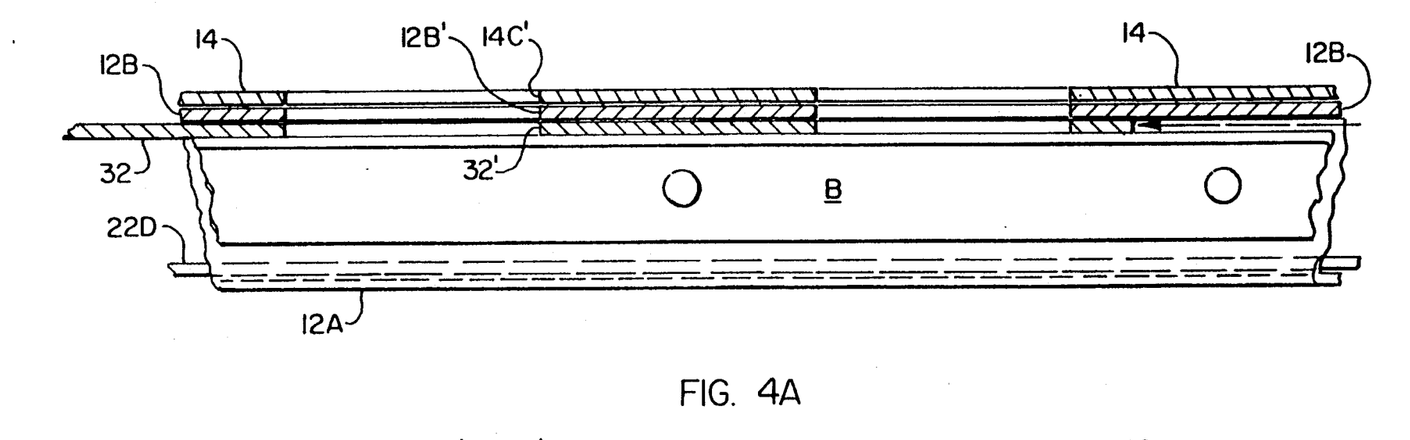
FIGS. 4A and 4B are vertical cross-sectional views taken along the line 4—4 of FIG. 3 and illustrating the lower housing apertures of the grill in the open and closed modes, respectively.
Figure 4B:
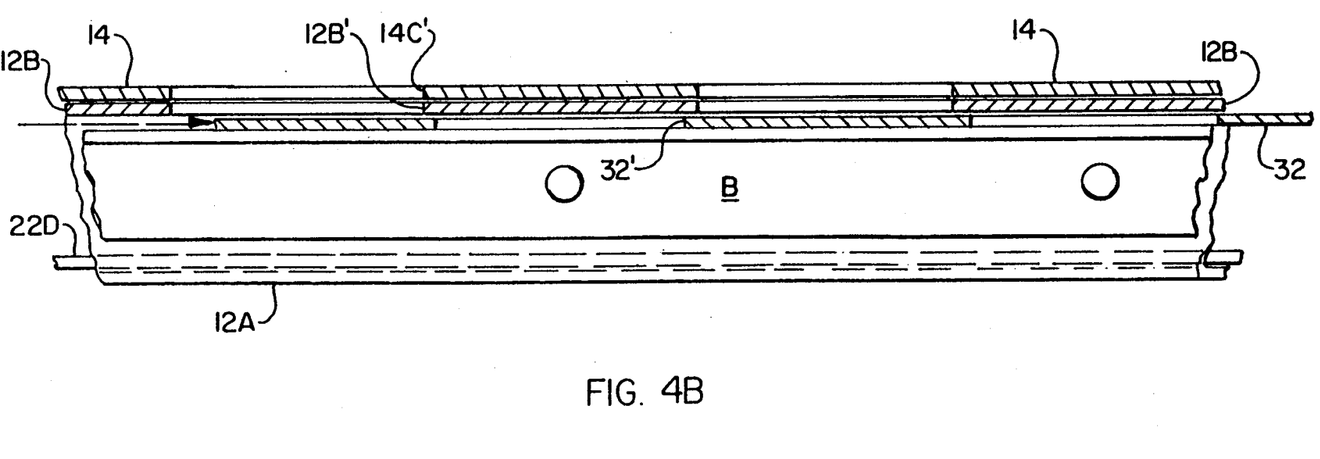
Figure 5:
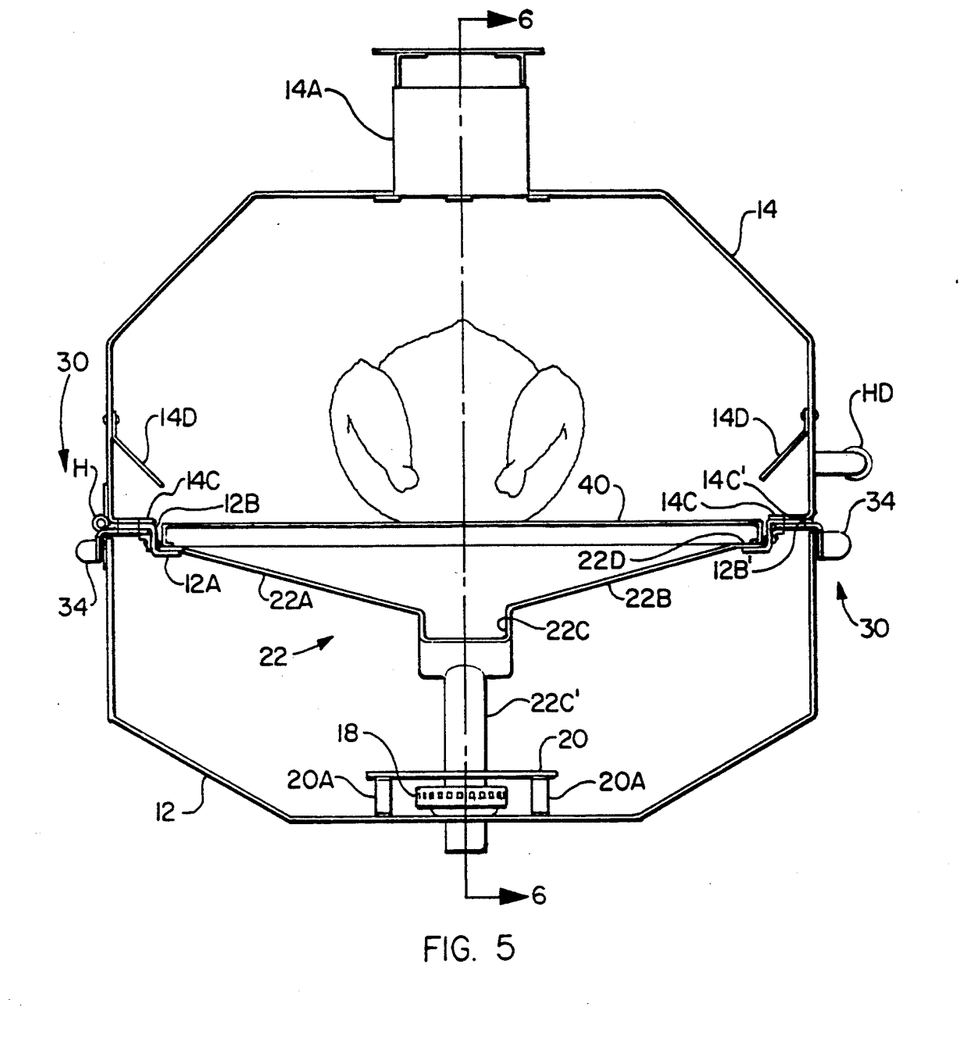
FIG. 5 is a vertical cross-sectional view taken laterally through the grill of the present invention.
Figure 6:
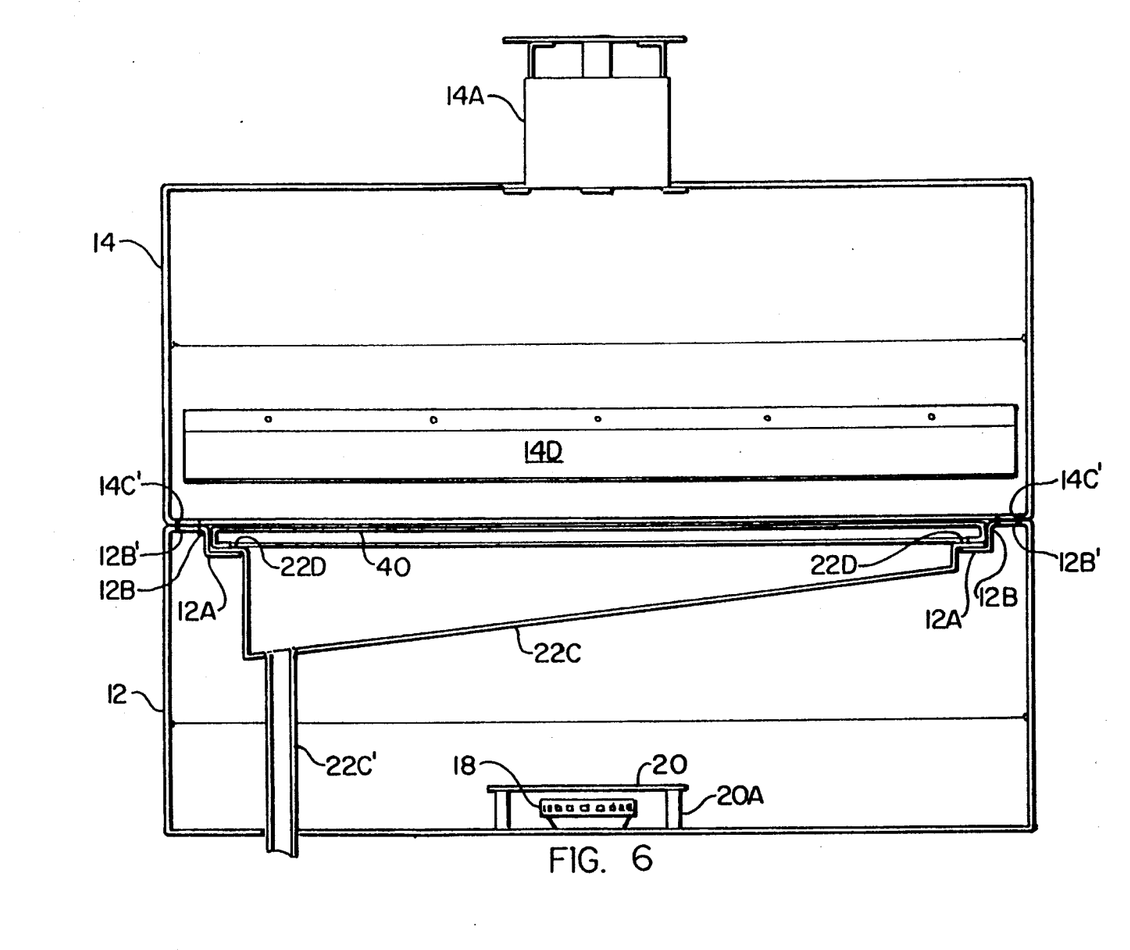
FIG. 6 is a vertical cross-sectional view taken along the line 6—6 of FIG. 5.

Referring now to FIGS. 3 and 4A, 4B, damper mechanisms 30 will be described in greater detail. Although applicant contemplates that any suitable type of damper mechanisms could be used in conjunction with some or all of apertures 12B' of lower housing 12 or, in the alternative, in conjunction with some or all of apertures 14C' of upper housing 14, a preferred damper mechanism 30 is shown in the drawings associated with each lengthwise side of lower housing 12 and will be described in detail herein. Damper mechanism 30 consists of a elongate bar 32 defining a plurality of apertures 32, therein which is mounted for slidable movement beneath the top surface of each lengthwise side or shoulder 12B of lower housing 12 defining apertures 12B' therein. Most suitably, a damper mechanism 30 is not provided within either of the lateral sides of lower housing 12 and the apertures 12B' thereof provide unobstructed heat flow into upper housing 14.

Figure 1:
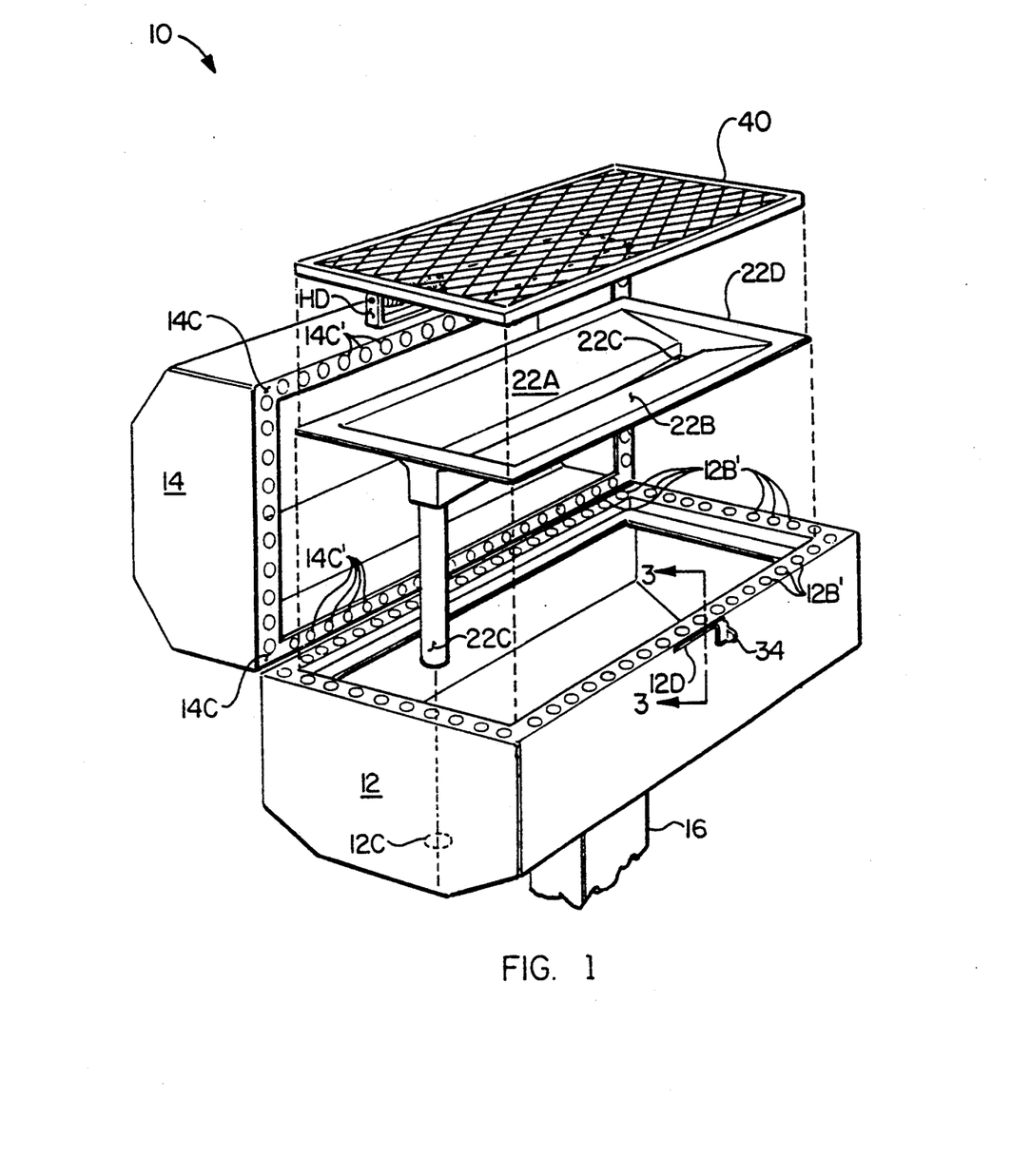
FIG. 1 is an exploded perspective view of the improved barbecue grill of the present invention.
Figure 2:
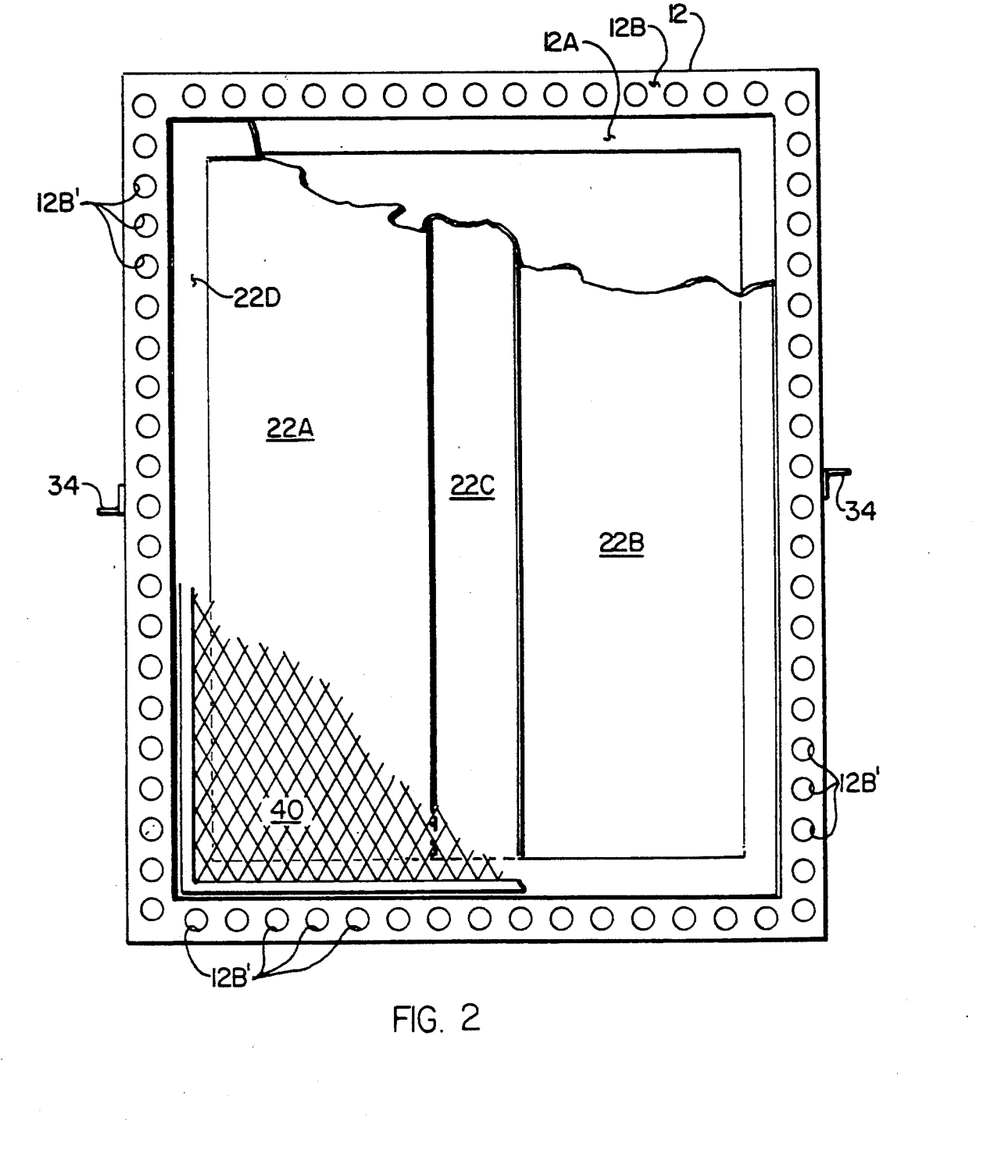
FIG. 2 is a top plan view, with parts broken away for clarity, of the grill of the present invention (with the upper housing or hood removed)

Elongate bar 32 of damper mechanism 30 is slidably supported on one side by bracket B (see FIG. 3) secured within the inside surface of shoulder 12B and on the other side by actuator tab 34 which is adapted for lateral translation within horizontal slot 12D within lower housing 12 (see FIGS. 1 and 3). Thus, tab 34 may be moved from side to side in order to bring apertures 32' in elongate bar 32 into vertical registration (see FIG. 4A) with apertures 12B' in order to provide for heat flow from lower housing 12 into upper housing 14 or slidably translated relative to apertures 12B' of lower housing 12 so as to either partly or fully close (see FIG. 4B) apertures 12B' and thus prevent any heat flow from lower housing 12 to upper housing 14.

Barbecue grill 10 may be used to cook hot grill items such as hamburgers, hot dogs and steak by adjusting damper mechanisms 30 so as to obstruct heat flow through apertures 12B' so that most of the heat for cooking the food is provided from beneath by convection through drip pan 22. In this fashion, barbecue grill 10 acts to very efficiently cook hot grill items in an efficient and tasty manner. Alternatively, if it is desired to cook items such as roast, turkey, prime rib, leg of lamb, or even casseroles, bread, pies and cakes which would normally require convection heat around the entire surface thereof (such as provided by a conventional kitchen oven), the user merely slidably adjusts damper mechanisms 30 so as to allow more heated air flow through lower housing apertures 12B' and upper housing apertures 14C' by slidably moving elongate bar 32 so that apertures 32' thereof are placed in vertical registration with lower and upper housing apertures 12B' and 14C', respectively. This serves to help equalize temperature both beneath and above the food on the grill and to cook the aforementioned foods with a high degree of efficiency which has not been known heretofore in an outdoor barbecue grill cooking apparatus.

The cooking capabilities of grill 10 are accomplished by effectively fluidly sealing lower housing 12 from upper housing 14 except with respect to heat flow through apertures 12B' and 14C', respectively. Thus, heat flow is not permitted to flow around the perimeter of drip pan 22 such as occurs in prior art grills utilizing drip pans to remove grease during the cooking process. A secondary desirable effect resulting from the instant invention is that the usable cooking area size is increased without increasing the size of the grill since the unusable hot area around the perimeter of conventional prior art grills using grease collecting drip pans is now rendered usable. Barbecue grill 10 has eliminated all hot spots from drip pan 22 and the potential for "flaming" or "flame up" which results therefrom while providing a barbecue grill which allows for selective adjustment of the relative temperature between the lower housing and the upper housing thereof for heretofore unknown food cooking flexibility.

As can be appreciated, although a preferred embodiment of the invention has been disclosed herein, applicant contemplates that other embodiments of the invention are possible which would incorporate the concept of the present invention for controlled heat distribution between the lower and upper housing of a barbecue grill in order to enhance food cooking capabilities. For example, apertures may be selectively provided along one, two, three or four sides of lower housing 12, as may be desired, and may be utilized either with or without a damper mechanism 30 or with one or more damper mechanisms associated with only a portion of total apertures 12C'. Furthermore, although the preferred embodiment of the invention contemplates providing a plurality of apertures 14C' around the perimeter of the opening of the upper housing corresponding to lower housing apertures 12C', applicant contemplates that the upper housing could be formed without shoulder or lip 14C and thus not require the utilization of apertures 14C' therein in order to allow heat flow from apertures 12B' of lower housing 12 into upper housing 14. Therefore, the invention is broadly contemplated as providing a barbecue grill having the lower housing and upper housing substantially fluidly sealed with the exception of a plurality of apertures around at least a portion of the perimeter of the bottom housing to allow selected heat flow therefrom into the upper housing in order to obtain optimal food cooking capabilities.

It will be understood that various details of the invention may be changed without departing from the scope of the invention. Furthermore, the foregoing description is for the purpose of illustration only, and not for the purpose of limitation--the invention being defined by the claims.

What is claimed is:

1. A barbecue grill for cooking food comprising;
   (a) A lower housing having an upper and a lower portion;
   (b) heating means for providing cooking heat located within said lower housing;
   (c) food supporting means supported by said lower housing and located within the upper portion thereof and above said heating means;
   (d) an upper housing or hood adapted to enclose said lower housing and having an upper and a lower portion;
   (e) a grease collecting drip pan positioned beneath said food supporting means in said lower housing and adapted to be sealingly supported by said lower housing around the entire perimeter thereof so as to prevent heat flow therearound into said upper housing;
   (f) grease drainage means positioned within said housing and fluidly communicating with said drip pan for disposal of grease outside of said lower housing; and
   (g) a plurality of apertures provided adjacent at least a portion of the perimeter of the upper portion of said lower housing and adapted to facilitate heat flow from said lower housing into said upper housing.

2. A barbecue grill for cooking food according to claim 1 wherein said lower housing defines a lip around the perimeter of the upper portion thereof adapted to sealingly support the perimeter of said drip pan thereon, said lip being spaced relatively inwardly from said plurality of apertures provided in said lower housing.

3. A barbecue grill for cooking according to claim 2 wherein said food supporting means is removably supported by said drip pan.

4. A barbecue grill for cooking food according to claim 1 wherein said heating means comprises a gas burner.

5. A barbecue grill for cooking food according to claim 1 wherein the lower portion of said upper housing defines a plurality of apertures around at least a portion of the perimeter thereof corresponding to and in vertical registration with said apertures in said lower housing to allow heat flow from said lower housing into said upper housing.

6. A barbecue grill for cooking food according to claim 1 wherein said drip pan comprises two planar surfaces sloping downwardly to a central inclined channel therebetween having an upper end and a lower end, said channel having an aperture at its lower end, and said grease drainage means comprises a drainage conduit communicating with said aperture and depending downwardly therefrom.

7. A barbecue grill for cooking food according to claim 1 wherein said plurality of apertures comprises a plurality of spaced-apart apertures around the perimeter of the top portion of the bottom housing, and including means for selectively adjusting the opening size of at least a portion of said plurality of apertures so as to control heat flow from said lower housing to said upper housing.

8. A barbecue grill for cooking food comprising:
(a) A lower housing having an upper and a lower portion and defining a lip around the perimeter of the upper portion thereof;
(b) heating means for providing cooking heat located within said lower housing;
(c) food supporting means supported by said lower housing and located within the upper portion thereof and above said heating means;
(d) an upper housing or hood adapted to enclose said lower housing and having an upper and a lower portion;
(e) a grease collecting drip pan positioned beneath said food supporting means in said lower housing and adapted to be sealingly supported by said lip of said lower housing around the entire perimeter thereof so as to prevent heat flow therearound into said upper housing;
(f) grease drainage means positioned within said lower housing and fluidly communicating with said drip pan for disposal of grease outside of said lower housing; and
(g) a plurality of apertures provided relatively outwardly from said lip and around the perimeter of the upper portion of said lower housing and adapted to facilitate heat flow from said lower housing into said upper housing.

9. A barbecue grill for cooking according to claim 8 wherein said food supporting means is removably supported by said drip pan.

10. A barbecue grill for cooking food according to claim 8 wherein said heating means comprises a gas burner.

11. A barbecue grill for cooking food according to claim 8 wherein the lower portion of said upper housing defines a plurality of apertures around at least a portion of the perimeter thereof corresponding to and in vertical registration with said apertures in said lower housing to allow heat flow from said lower housing into said upper housing.

12. A barbecue grill for cooking food according to claim 8 wherein said drip pan comprises two planar surfaces sloping downwardly to a central inclined channel therebetween having an upper end and a lower end, said channel having an aperture at its lower end, and said grease drainage means comprises a drainage conduit communicating with said aperture and depending downwardly therefrom.

13. A barbecue grill for cooking food according to claim 8 wherein said plurality of apertures in said bottom housing includes means for selectively adjusting the opening size of at least a portion of said plurality of apertures so as to control heat flow from said lower housing to said upper housing.

14. A barbecue grill for cooking food according to claim 8 including a ventilator in said upper housing.

* * * * *